May 24, 1949. V. M. J. ANCET Re. 23,114

THREAD OPERATED STOP MOTION IN CIRCULAR LOOMS

Original Filed April 13, 1946 2 Sheets-Sheet 1

INVENTOR.
Victor Marie Joseph Ancet
BY
Hamilton, Lake & Co.
AGENTS.

May 24, 1949. V. M. J. ANCET Re. 23,114

THREAD OPERATED STOP MOTION IN CIRCULAR LOOMS

Original Filed April 13, 1946 2 Sheets-Sheet 2

INVENTOR.
Victor Marie Joseph Ancet
BY
Haseltine, Lake & Co.
AGENTS.

Reissued May 24, 1949

Re. 23,114

UNITED STATES PATENT OFFICE 23,114

THREAD OPERATED STOP MOTION IN CIRCULAR LOOMS

Victor Marie Joseph Ancet, Lyon, France, assignor, by mesne assignments, to Regina, S. A., a societe anonyme, Tangiers, Morocco Original No. 2,433,824, dated January 6, 1948, Serial No. 661,920, April 13, 1946. Application for reissue December 29, 1948, Serial No. 68,333

9 Claims. (Cl. 139—371)

This invention relates to loop stop motions, which include a light detector member held in one position by a tensioned thread and moving, upon slackening of the tension, for example, because of the breaking of the thread, to a second position, the member in such movement operating electrical or mechanical means for stopping the loom. More particularly, the invention is concerned with a novel weft stop motion, in which the detector member is carried by the shuttle assembly of the loom and is separated by a sheet of warp from the parts, on which it is to act. The new stop motion, is accordingly, especially adapted for use on circular looms, in which the shuttle assembly is moved by suitable means along a circular path through a shed of warp threads and thus lies on one side of one sheet of warp threads of the shed, while the means for moving the assembly lie on the other side of the sheet of threads.

In a preferred form of embodiment of the invention, which is suitable for use on a circular loom, the stop motion includes a detector member mounted on the shuttle assembly and engaging the weft thread passing from the weft supply in the shuttle to the fell of the fabric. The member is biased in one direction and is held against its bias by the weft thread, so long as the thread is under tension. Outside one of the sheets of warp threads in the shed, preferably the inner sheet, is mounted at least one finger, which is operable to advance with the shuttle assembly and penetrate the sheet of warp threads adjacent the assembly periodically. The finger is also movable to operate means for stopping the loom. When the weft thread is unbroken, the finger encounters no obstruction as it penetrates the sheet of threads, but, when the weft thread breaks, the detector member is moved by its bias into the path of the finger and, as the finger next penetrates the sheet, it encounters the member and is moved to actuate the loom stopping means.

For a better understanding of the invention, reference may be made to the accompanying drawings, in which Fig. 1 is a partial side elevational view of a shuttle assembly of a circular loom equipped with the new weft stop motion;

Figure 1:
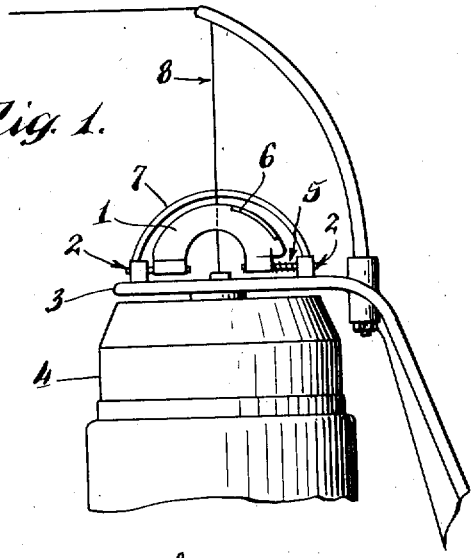
Figure 2:
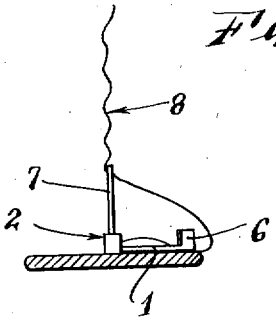
Fig. 2 is a partial vertical sectional view at right angles to Fig. 1.
Figure 3:
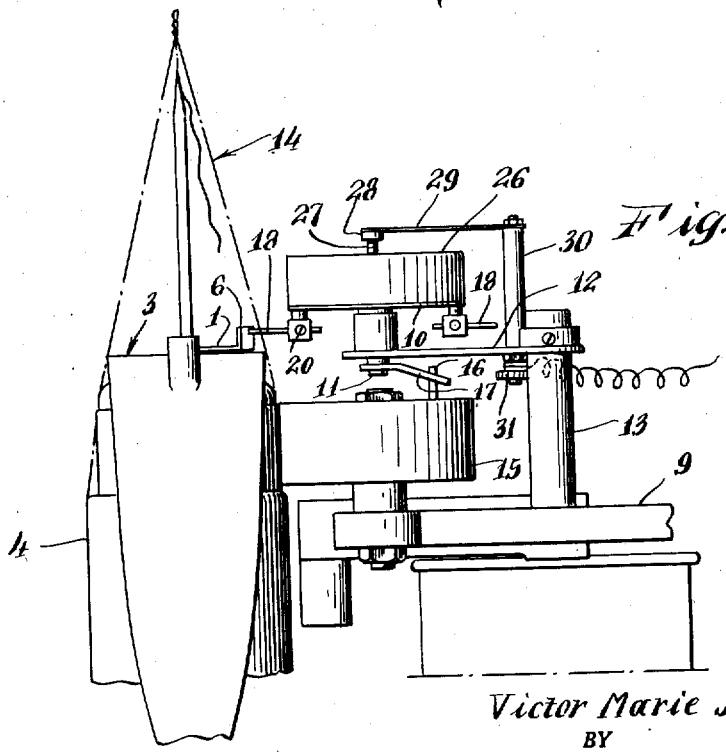
Fig. 3 is a front elevational view of part of the shuttle assembly and the stop motion of the invention.
Figure 4:
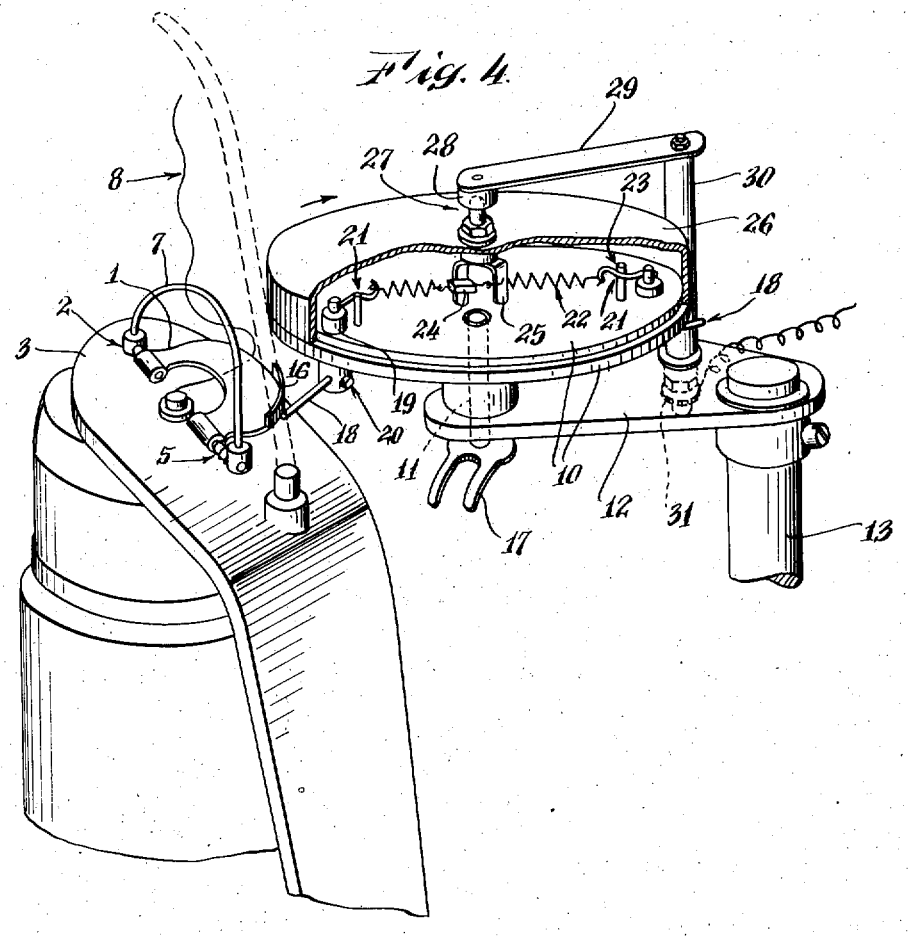
Fig. 4 is a perspective view of the parts shown in Fig. 3, with portions of the stop motion broken away.
Figure 5:
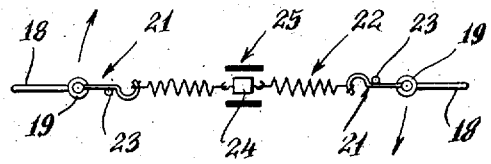
Figs. 5 and 6 are diagrammatic views showing the mode of operation of the new stop motion.
Figure 6:
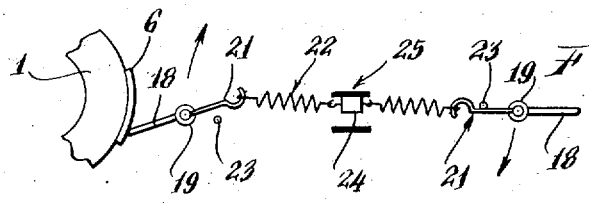

The weft stop motion is illustrated in the drawings installed in a circular loom and it includes a movable detector member 1 arcuate in form and mounted to pivot on a horizontal axis in lugs 2 extending upwardly from the top of frame 3, in which the shuttle 4 is mounted. The frame and shuttle together make up the shuttle assembly of the loom. The member 1 is biased to swing toward horizontal position by a light spring 5 and, along one outer edge, carries a flange 6, which extends vertically, when the member is horizontal. A bowed member 7 extends upwardly from lugs 2 and lies outside the path of movement of the member 1. The weft thread 8 passing from the supply within the shuttle 4 to the fell of the goods is led up along the unflanged side of the member 1 and along the opposite side of the member 7. So long as the thread is under tension, it holds member 1 erect against the bias action of spring 5, but, if the thread breaks, member 1 is released and is moved to horizontal position.

A circular plate 10 is keyed to a shaft 11 mounted for rotation in a plate 12, which is attached to a standard 13 rising from the arm 9 forming part of the driving means for the shuttle assembly, and the plate lies inwardly from and close to the inner sheet of warp threads 14 of the shed. The shaft 11 is in vertical alignment with one of the rollers 15 driving the shuttle, and, as roller 15 rotates during the operation of the loom, a pin 16 extending upwardly from the roller between the legs of a fork 17 fast on shaft 11 causes rotation of the shaft. One or more fingers 18 are mounted in openings through respective pivot pins 19, which extend through plate 10, and the fingers project outwardly beyond the edge of the plate. The fingers are mounted for adjustment in the openings through the pins and may be held in desired adjusted position by set screws 20. During the rotation of the plate with roller 15, the fingers successively penetrate the inner sheet of the warp threads of the shed and sweep over that part of the top of frame 3, that is occupied by the detector member 1, when it has been swung to horizontal position.

The pivot pin 19 of each finger 18 projects above the plate 10 and carries a hook 21. The hooks of the two fingers are connected by a spring 22, which tends to align the hooks and thus maintain the fingers 18 in the desired position with reference to plate 10. A pair of stop pins 23 project upwardly from plate 10 in position to be engaged by hooks 21 and limit the rotational movement of the hooks and pins in one direction, while permitting such movement in the opposite direction.

The central portion of the spring 22 is replaced by a contact member or contact 24, which lies beneath a two-pronged terminal member or terminal 25 carried by the lower end of a bolt 27 mounted in an opening in a cover 26, which fits into a peripheral groove in the edge of plate 10 and, with it, forms a drum. A cap 28 fits over the end of bolt 27 and is connected by a spring blade 29 to a post 30, which is mounted in an opening in plate 12 and insulated therefrom. Current is supplied to the post 30 through a terminal 31 and, when contact member 24 is in contact with either prong of terminal 25, the current passes from terminal member 25 to contact 24 and thence to ground. The closing of the circuit causes a flow of current, which operates a relay (not shown) which, in turn, operates conventional means for stopping the loom.

The operation of the new weft stop motion is as follows. As the shuttle is moved along its circular path through the shed of warp threads during the operation of the loom, the drum, consisting of plate 10 and cover 26, is continuously rotated. Each finger 18 extending outwardly from plate 10 is carried around with the drum, and, as the finger approaches the inner sheet of the shed, it penetrates that sheet and sweeps over the top of frame 3. During such movement of the fingers, the spring 22 holds the hooks 21 against their stop pins 23 and contact 24 lies between and free of the prongs of terminal 25. Whenever the weft thread breaks, the detector member 1 is swung to horizontal position by its spring 5 and its flange 6 then lies in the path of fingers 18. When the next finger starts to sweep across the top of frame 3, it encounters the flange and is arrested thereby. The continued rotational movement of the drum then causes a swinging movement of the arrested finger 18 and its pivot pin 19 relative to the plate 10, and this movement causes the hook 21 of the finger to swing away from its stop pin 23 and bring the contact member 24 into engagement with one of the prongs of terminal 25. The circuit, by which the loom stopping means is actuated, is thus established and the loom is brought to rest.

In the stop motion described, the swinging of one of the fingers 18, caused by its engagement with the flange 6 of member 1, when the latter has moved to horizontal position upon breaking of the weft thread, closes a circuit, which effects the stopping of the loom, but the swinging of the fingers can be employed, if desired, to actuate mechanical means for stopping the loom. Also, the actuation of the loom stopping means may be accomplished by a translational rather than a rotational movement of either finger. The mechanism described includes a pair of fingers but a single finger may be employed, in which case, the spring 22 is connected, at one end, to the hook of the finger and, at the other end, to a fixed pin on plate 10. When a single finger is employed, the terminal member 25 need have only a single prong.

I claim:

1. A weft stop motion for use in a loom having a shuttle assembly and means for advancing the assembly through a shed of warp threads, which comprises loom stopping means, a finger operable to advance with the assembly and penetrate one sheet of warp threads of the shed periodically adjacent the assembly, the finger also being movable to operate the loom stopping means, means for operating the finger, and a member mounted on the assembly and engaging the weft thread leaving the shuttle and held thereby as long as the thread is under tension, the member biased toward a position, in which it intercepts and causes movement of the finger to operate the loom stopping means.

2. A weft stop motion for use in a loom having a shuttle assembly and means for advancing the assembly through a shed of warp threads, which comprises loom stopping means, a finger operable to advance with the assembly and to revolve about an axis to penetrate one sheet of warp threads of the shed periodically adjacent the assembly, the finger also being movable to operate the loom stopping means, means for advancing and revolving the finger, and a member mounted on the assembly and engaging the weft thread leaving the shuttle and held thereby as long as the thread is under tension, the member being biased toward a position, in which it intercepts and causes a movement of the finger to operate the loom stopping means.

3. A weft stop motion for use in a loom having a shuttle assembly and means for advancing the assembly through a shed of warp threads, which comprises a rotary element carried by the advancing means outside the shed adjacent the assembly, means for rotating the element, a finger carried by the element and periodically penetrating one sheet of warp threads of the shed adjacent the assembly, as the element rotates, the finger being movably mounted on the element, loom stopping means actuated by movement of the finger relative to the element, and a member mounted on the assembly and engaging the weft thread leaving the shuttle and held thereby as long as the thread is under tension, the member being biased toward a position, in which it intercepts said finger and causes movement thereof relative to the element, as the finger is carried along with the element.

4. A weft stop motion for use in a loom having a shuttle assembly and means for advancing the assembly through a shed of warp threads, which comprises a rotary element carried by the advancing means outside the shed adjacent the assembly, means for rotating the element, a finger carried by the element and projecting beyond the periphery thereof, the finger periodically penetrating one sheet of warp threads of the shed adjacent the assembly, as the element rotates, and being mounted for movement relative to the element, loom stopping means actuated by movement of the finger relative to the element, and a member mounted on the assembly and engaging and held in one position by the weft thread leaving the shuttle, as long as the thread is under tension, the member being biased toward a second position and moving thereto, when the thread breaks, the member in said second position intercepting and causing movement of the finger relative to the element, as the finger is carried along with the element.

5. A weft stop motion for use in a loom having a shuttle assembly and means for advancing the assembly through a shed of warp threads, said means including a roller rotating in contact with one sheet of warp threads of the shed, which comprises a rotary element carried by the advancing means outside the shed adjacent the shuttle assembly and rotated by said roller, a finger carried by the element and periodically penetrating one sheet of warp threads of the shed adjacent the assembly, as the element rotates, the finger being movably mounted on the element, loom stopping means actuated by movement of the finger relative to the element, and a member mounted on the assembly and engaging the weft thread leaving the shuttle and held thereby as long as the thread is under tension, the member being biased toward a position, in which it intercepts said finger and causes movement thereof relative to the element, as the finger is carried along with the element.

6. A weft stop motion for use in a loom having a shuttle assembly and means for advancing the assembly through a shed of warp threads, which comprises a rotary element carried by the advancing means outside the shed adjacent the assembly, means for rotating the element, a finger pivotally mounted on said element and normally held against pivotal movement by spring means, the finger projecting beyond the element and periodically penetrating one sheet of warp threads of the shed adjacent the assembly, as the element rotates, loom stopping means actuated by pivotal movement of the finger, and a member mounted on the assembly and engaging and held in one position by the weft thread leaving the shuttle, as long as the thread is under tension, the member being biased toward a position, in which it is engaged by and causes pivotal movement of the finger, as the latter is moved with the element.

7. A weft stop motion for use in a loom having a shuttle assembly and means for advancing the assembly through a shed of warp threads, which comprises a hollow member mounted for rotary movement, a loom stopping circuit, including a stationary and a movable contact within the member, a finger pivotally mounted on the member and connected to the movable contact, the finger being normally held against pivotal movement and operating, upon such movement, to move the movable contact into engagement with the stationary contact and establish the circuit to stop the loom, the finger projecting beyond the element and periodically penetrating one sheet of warp threads of the shed adjacent the assembly, as the element rotates, and a member mounted on the assembly and engaging and held in one position by the weft thread leaving the shuttle, as long as the thread is under tension, the member being biased toward a position, in which it is engaged by and causes pivotal movement of the finger, as the latter is rotated with the element.

8. A weft stop motion for use in a loom having a shuttle assembly and means for advancing the assembly through a shed of warp threads, which comprises a rotary element carried by the advancing means outside the shed adjacent the assembly, means for rotating the element, a finger carried by the element and periodically penetrating one sheet of warp threads of the shed adjacent the assembly, as the element rotates, the finger being movably mounted on the element, loom stopping means actuated by movement of the finger relative to the element, and a fixed and a spring-pressed movable member mounted on the assembly, the weft thread leaving the shuttle being led between said members and holding the movable member against movement, as long as the thread is under tension, the movable member being urged by its spring toward a position, in which it intercepts and causes movement of the finger relative to the element, as the finger is rotated with the element.

9. A weft stop motion for use in a circular loom having a shuttle assembly and means for advancing the assembly along a circular path through a shed of warp threads, which comprises loom stopping means, a rotary element carried by the advancing means adjacent the assembly and along a circular path close to that traveled by the assembly, means for rotating the element, a finger carried by the element and periodically penetrating the inner sheet of warp threads of the shed, as the element rotates, the finger being mounted for movement relative to the element and operating the loom stopping means in such movement, and a member mounted on the assembly and held in one position by the weft thread leaving the shuttle, so long as the thread is under tension, the member being biased toward a second position, in which it is engaged by the finger, as it rotates with the element, and causes a movement of the finger relative to the element.

VICTOR MARIE JOSEPH ANCET.

No references cited.